United States Patent Office 3,235,355
Patented Feb. 15, 1966

3,235,355
METHOD FOR PREPARING HERBICIDAL PELLET
Adam F. Klopf, Bay City, Mich., assignor to The Dow Chemical Company, Midland, Mich., a corporation of Delaware
No Drawing. Filed Feb. 2, 1962, Ser. No. 170,805
3 Claims. (Cl. 71—2.3)

The present invention is concerned with the production of rice and is more particularly directed to an instrumentality to be used in weed control in the production of rice, as well as to a method for the preparation of the said instrumentality.

It has long been known that a pentachlorophenate substance, such as pentachlorophenol or its somewhat soluble salts, is useful for the control of weeds in rice. The rice plant is relatively tolerant of low concentrations of the pentachlorophenate substance, whereas most of the weeds of which the growth is deleterious to the production of rice are readily killed by the pentachlorophenate. However, the employment of such pentochlorophenol substances has hitherto been seriously handicapped by the lack of a suitable, inexpensive, available means or instrumentality for the distribution of such substance. This has been especially true when the pentachlorophenate was applied by hand. The necessary distribution is rendered more difficult by the fact that the pentachlorophenate material is most useful for the control of weeds in rice at a season when, according to the forms of culture employed throughout large parts of the world, the rice field is flooded, so that application must be made to the water surface, but must act in and beneath the water.

In many countries wherein rice is a major item of food, any such application is conventionally made by hand. Typically, the working supply of herbicidal substance is carried in a bag suspended from the shoulders of the person making the application. However, the hand application of strong chemical herbicides is a relatively new practice and it has been beset by serious problems hitherto unsolved.

As commonly offered for sale to industrial users, sodium pentachlorophenate is packaged in containers that carry detailed warnings to users to avoid skin contact. It is known that particles of small size constitute a more serious problem than particles of larger size, because their larger surface area per unit weight renders them more quickly soluble. Also, when entrained by moving air, fine particles of sodium pentachlorophenate are strongly lachrymatory and sternutatory. When a pentachlorophenate is applied as a finely divided solid, control of particle sizes is necessary in order to avoid blowing of damaging amounts of the substance into regions which it is not desired to treat and to assure desired application to treated areas.

Thus, especially for hand application to inundated agricultural crop land, there has been a need for a dense, durable, dilute, uniformly particulate pentachlorophenate product essentially free of particles of subuniform size.

Methods are known in the art for the self-pelleting of pentachlorophenol. However, as has been noted, the hand application of a pentachlorophenate in the general form of pellets for effective weed control in rice requires that the pellets or particles be uniformly of a size within a fairly narrow range. Moreover, the use of particles of a pure pentachlorophenate has not proved to be generally feasible. When such particles of pure material are employed, they must be scattered very thinly and uniformly to avoid localized overdosing. However, when thinly scattered by hand, even by a skilled user, small pellets made in standard techniques, because of entrapped air and small size may float, at least temporarily. This has several bad effects. It results in irregular distribution of the toxicant in water; so that in some zones all vegetation including the rice is killed or seriously injured whereas in other zones weeds remain uncontrolled.

Moreover, such floating pellets tend to accumulate on the body of the user, usually on the lower limbs, at water line, and, by high local concentration, tend to cause serious irritation. A desired pellet should sink immediately when placed on the surface of water.

Pellets have been made using clay as a binder, diluent, and nucleating agent. Because clay is readily dispersed in finely subdivided form, it has been common experience in preparation of these beads that screening and recycling of a substantial part of the product has been necessary in order to avoid excessive amounts of "fines," that is to say, particles of size so small as to be susceptible of undesired or forbidden air drift, impractical to apply by hand, and inconveniently irritant and sternutatory to the user. Moreover, toxicants in formulation in clay pellets for use in water tend to remain entrapped within the clay whereas they go into solution quickly from the surface of a dense, impermeable sand particle.

Accordingly, it has been desired to develop an improved means for the distribution of sodium pentachlorophenate for control of weeds. It has been desired to develop a means suitable for use from airplanes with little or no air-borne drift of toxicant material, and yet suitable for application by hand. It has been desired to prepare such product as inexpensively as possible. Inasmuch as a substantial part of the weight of typical such products is in the nature of an inert bodying or nucleating agent, it has been desired that the substance be susceptible of preparation with a minimum of equipment under primitive conditions near to the site where it is to be applied. It has also been desired to make use of some inexpensive, abundant, and as nearly as possible universally available bodying or nucleating agent.

These and other objectives are achieved according to the present invention. I have discovered a process for the preparation of a herbicidal pelleted product consisting essentially of sodium pentachlorophenate, durably deposited upon a dense, vitreous, particulate nucleus, the resulting pellets being of such uniformity and size as to permit their ready application by hand, by air, or otherwise, with good, direct fall into a desired location, with immediate submersion in water, and little or no problem of air-borne drift of dust. I have achieved the preparation of this product without the use of any extraneous adhesive or binder agent. Moreover, the product is adapted to be prepared under relatively primitive or simple conditions with the minimum outlay of capital. The product can be prepared in large or small batches or continuously with equal ease.

While the resulting product is especially adapted to be applied by hand, a method employed in major parts of the world, it may, if desired, be applied in any other way in which a dense, uniform, durable, dilute particulate solid herbicide can be applied. While it is deemed to be most useful in the protection of rice from weeds in fields that have been flooded, the employment of the product is not deemed to be confined to the treatment of flooded fields nor of rice.

Sodium pentachlorophenate has a specific gravity, scientifically measured, of a little less than 2. However, the problem encountered in its addition to water is better represented by the fact that a standard commercial flake product has a bulk density about a third that of water, and a commercial self pellet product has a bulk density about the same as that of water. The entrapment of some amount of air is usually unavoidable in the production of pellets, with the result that a pellet seldom has a bulk density as great as the true specific gravity of the substance of which it is primarily composed. Thus, despite its true specific gravity, pure sodium pentachlorophenate is not well adapted to use in water.

The present product is improved over standard self pellets by the use of a dense, insoluble, soil-compatible nucleating agent by reason of the presence of which the individual pellets sink with rapidity through the surface and to the bottom of a body of water, when scattered on the surface thereof. Because the water in flooded rice paddies is essentially unmoving, and because the toxicant dissolves from the surface of a sand particle at the bottom of such water, there tends to develop a highly effective herbicidal zone at the bottom of the body of water. This is a position at which many rice weeds are especially vulnerable.

According to the present invention, I have discovered that a pellet of generally uniform size consisting essentially of sodium pentachlorophenate firmly adherent to a dense nucleus of vitreous material can be prepared from starting materials consisting essentially of sodium pentachlorophenate and generally uniformly particulate vitreous material which comprises the steps of (1) Wetting the particulate vitreous material with an approximately saturated water solution of sodium pentachlorophenate of an amount such that the water content by weight corresponds to approximately 3 to 15 percent of the weight of vitreous material, (2) Adding to the resulting vitreous material an amount of finely divided solid sodium pentachlorophenate such that, together with the sodium pentachlorophenate in the said aqueous solution there is added a total amount of sodium pentachlorophenate by weight corresponding to from fifteen to thirty percent of the combined weight of sodium pentachlorophenate and vitreous material, (3) Evaporatively removing water until the resulting mass of material is palpably dry, with (4) Maintenance of continuous differential movement within the mass of resulting material during the time water is being removed.

It is important to add the sodium pentachlorophenate as a "powder." Good results have been obtained by using the sodium pentachlorophenate as a powder which passes a 35 mesh screen. When it is desired to obtain a relatively uniform finished product the vitreous material that is used as a nucleus material should first be screened. Preferred results have been obtained by the use of a screened natural silica sand, all of which passes through a 10 mesh screen and all of which is retained on a 14 mesh screen. The process of the present invention is operable with nucleus particles outside this size range; but the use of larger sand particles results in either too thin a deposit of sodium pentachlorophenate to provide efficient distribution thereof or particles so large as to be objectionable in the process of distribution and as unduly large centers of pentachlorophenate concentration; the use of smaller nucleus particles results in "clumping together" of the resulting product during manufacture with formation of excessively large particles or, alternatively, results in the preparation of coated particles so small as to give rise to the objectionable aspects previously mentioned.

The exact amount of pentachlorophenate solution to be employed expressed as, for example, percent water by weight of sand varies essentially according to surface area: whether the employed sand is a residual or a so-called "sharp" sand—that is to say, a sand of which the individual grains are characterized by conchoidal fractures and irregular angularities of surface feature, or on the other hand a water-worn or windborne round sand; and what proportion of the sand falls within various screen sizes, as well as other factors. Using a preferred sand of 10 to 14 mesh size, very good results have been obtained by employing saturated pentachlorophenate solution representing from 5 to 7 percent of water by weight of air-dry sand. However, this relative amount is susceptible of moderate variation. If the sand be insufficiently moist or unevenly moist therewith, those parts lacking sufficient moisture will not accept a desired coating of sodium pentachlorophenate; if excessively moist, not only will the drying process be wastefully prolonged and expensive, but the resulting product will tend to "ball" with the resulting production of particles larger and smaller than desired. The practical limits of amounts of water as solution of pentachlorophenate are approximately 3 to 15 percent water by weight of dry sand.

The pentachlorophenate solution with which the sand is to be wet may be prepared in situ. When desired, this can be done by wetting the sand with water to the necessary extent and adding a portion of the finely subdivided sodium pentachlorophenate thereto, with stirring and heating, and thereafter adding further finely divided dry sodium pentachlorophenate. In such procedure a most preferred amount of water is from 5 to 7 percent by weight of dry sand. The initially added amount of sodium pentachlorophenate should preferably be of about such amount as will produce a saturated solution in employed water.

Upon the completion of the addition of the sodium pentachlorophenate, the resulting mixture is to be agitated and stirred so as to effect a thoroughly uniform distribution of the sodium pentachlorophenate within and through the sand wet with pentachlorophenate solution. Thereafter, with continued agitation, the resulting mixture is dried.

Pelleting mills of great complexity and ingenuity are known. It is among the advantages of the present invention that a satisfactory resulting product is obtained when drying is carried out with the most simple or even primitive of means. That which has proved to be critically necessary is that the drying be carried out with more or less continuous differential movement of particles, as by agitation. Such agitation should be sufficient to maintain the resulting particles in a separated condition. When it is desired to obtain a uniform pelleted product intended to look attractive, a commercial pelleting mill may be used. When it is desired to obtain a product inexpensively and with simple equipment, a tumbling apparatus not necessarily more complicated than a hand-turned rotary oil drum or concrete mixer without interior baffles may be employed; heat may take the form of flame or other heat source playing on the outside of the rotating drum of the said apparatus or may be a flame playing upon the contents thereof, or may be any convenient means of application of heat. If no more sophisticated equipment is available, the mixture of sand, pentachlorophenate solution, and pentachlorophenate may be hand stirred employing, for example, wooden paddles or spades in a stationary vessel, preferably a metallic vessel to the bottom of which heat can be applied to drive off water. Also, a drum can be rolled back and forth over embers as the contents, as described, are dried. Relatively thorough and uniform mixing and prompt heating are preferred when it is desired to obtain a most uniform product; but products that are satisfactory for the intended purpose are obtained under less uniform conditions.

The product may be prepared with the pentachlorophenate toxicant present in any desired concentration from a minimum of from about 1 to about 5 percent to as great a maximum as may be desired including, for example, 85 to 95 percent. However, for most satisfactory hand application for weed control in rice a concentration of from approximately 15 to 30 percent of toxicant and 70 to 85 percent of sand has been highly satisfactory. A most preferred concentration is about 25 parts of sodium pentachlorophenate with about 75 parts of sand, both by weight.

Those skilled in the art of the formulation of solid agricultural herbicides will at once recognize that, as to transportation of the present nucleated product in commerce it is in the nature of a disadvantage that a large proportion of the transported weight is inert nucleating agent and a minor proportion active toxicant. Accordingly, it is often desirable to prepare the product of the present invention at localities near to where the product will be used, assuming a nearby source of dense, vitreous nucleating agent which may be natural sand. Accordingly, the process of the present invention can readily be practiced and preferred products prepared with the following:

A source of sand.
A 10 mesh screen.
A 14 mesh screen.
A mixing container and mixing means.
Water.
Heat source.
Sodium pentachlorophenate to pass a 35 mesh screen.

Before the completion of the present invention, it was known that sodium pentachlorophenate could be made to for a self pellet, or a pellet upon a highly sorbent carrier such as sawdust, clay, vermiculite or the like.

Previous experience with sodium pentachlorophenate had led to the belief that while it might clump together with itself, it would either fail to adhere or, after drying would scale off the surfaces of sand so quickly as to leave many fine particles of sodium pentachlorophenate diluted with uncoated particles of sand. In practice, this has not proved to be the case; the sodium pentachlorophenate coating around each grain of sand has been typically relatively complete, uniform, and durable and has withstood without evident harm extensive shipment, agitation, and other disturbances expected to break it free from the sand nucleus. This newly discovered characteristic is believed to be especially advantageous in the present invention. Although clay is relatively widely distributed in nature, in order to be useful, especially under primitive conditions, the clay must be thoroughly prepared, usually at relatively high expense. Such preparation includes, customarily, dispersion of the said clay in water wherefrom large particles, pebbles and the like settle or may be screened out; permitting the sadi clay to settle in the water, which it does very slowly; or removing water by filtration or vaporiaztion, either of which is expensive; grinding the resulting clay and thereafter proceeding with the preparation of a product. In contrast, my invention can be practiced employing natural sand provided only that the particle size be acceptable; the natural sand can be brought to the necessary degree of wetness by simple draining over a retentive screen if too wet, or sprinkling or spraying with natural water if too dry; and the pentachlorophenate solution can be prepared in situ as hitherto described. While the range of acceptable moisture content is limited, as noted hereinbefore, a satisfactory moisture content can be estimated by observation and without detailed tests, by an operator who has a few times worked with mixtures of correct moisture content.

Although innumerable variations in sand particle size, sodium pentachlorophenate concentration and the like can be used, according to the present invention, the following example without more will teach those skilled in the art exactly how to proceed to prepare the present product.

*Example*

A saturated aqueous solution of sodium pentachlorophenate was prepared in a container by dispersing an excess of sodium pentachlorophenate in 100 parts of boiling water, both by weight. The resulting dispersion was vigorously stirred to obtain maximum concentration of dissolved sodium pentachlorophenate. Thereafter, the resulting solution was permitted to cool to room temperature. Undissolved sodium pentachlorophenate first settled to the bottom of the container and thereafter a small proportion of sodium pentachlorophenate precipitated out by crystallization as the solution cooled. At room temperature the resulting solution contained approximately 32 weight percent of sodium pentachlorophenate exclusive of undissolved portions. Seventy-five pounds of dry sand of 10–14 mesh grain size were wetted with an amount of said sodium pentachlorophenate solution representing about 5 pounds of water. The resulting mixture was thoroughly agitated to obtain uniform wetting, and was then transferred to an axially supported rotatable drum provided with means whereby the interior contents could be heated. The drum was slowly rotated at a peripheral velocity of approximately 80 to 85 feet per minute. The sand tumbled, and portions of it moved more rapidly than other portions. In this situation, there was added to the said wet sand finely divided sodium pentachlorophenate of which all particles would pass a 35 mesh screen and a high proportion was extremely fine dust. Rotating and resultant tumbling were continued until a uniform mixture was obtained and thereafter the entire resulting mixture was gradually heated by the application of heat external to the said drum whereby to drive off free water. When the resulting product appeared to be essentially dry, as ascertained by superficial examination of a withdrawn sample, the process was essentially complete and there was obtained a product consisting essentially of 75 parts by weight of sand and 25 parts by weight of sodium pentachlorophenate. Careful examination including microscopic examination disclosed that less than one-tenth of one percent by weight of product of free sodium pentachlorophenate dust remained; without screening or other sizing the resulting product was of a relatively uniform particle size, all particles passing a 7 mesh screen and none passing a 20 mesh screen. A representative sample of the said product, employed for the control for weeds in an area of a flooded rice paddie in standard procedures gives excellent results.

It should be understood that when control of product particle size is not critical, the present method may be employed with unscreened sand of any desired particle size; however, the employment of sand with an excessive quantity of unusually fine particles typically results in a product of which numerous particles "ball" to excessive size; also, such preparation results in a substantial proportion of "fines," which are often objectionable. When these considerations are immaterial, unscreened natural sand essentially free from roots and similar debris may be used. The presence in the sand of significant amounts of earthen material not sand tends to produce a less durable product of less regular particle size and is not preferred.

Particulate vitreous material other than silica sand, or natural or artificial sands other than silica may be used. Foundry or steel mill slag, vitreous frits or phosphate rock bearing plant nutrient minerals in slowly soluble form, may be used. Also gneiss, schist, granite, hornblende, feldspar, slate, syenite, diorite, peridotite, gabbro, obsidian and like vitreous nucleating materials, as sands, may be employed. Any of these substances is a satisfactory nucleating agent in the present process.

I claim:
1. Method of preparing a pellet from starting material consisting essentially of sodium pentachlorophenate and sand which comprises the steps of
   (1) wetting the sand with an approximately saturated water solution of sodium pentachlorophenate of an amount such that the water content by weight corresponds to approximately 3 to 15 percent of the weight of sand
   (2) adding to the resulting wet sand an amount of finely divided solid sodium pentachlorophenate such that, together with the sodium pentachlorophenate in the aqueous solution there is added a total amount of sodium pentachlorophenate by weight corresponding to from fifteen to thirty percent of the combined weight of sodium pentachlorophenate and sand

(3) evaporatively removing water until the resulting material is palpably dry, with (4) maintenance of continuous differential movement within the mass of material during the time water is being removed.

2. Method of claim 1 wherein the total amount of sodium pentachlorophenate is approximately twenty-five weight percent of the combined weight of pentachlorophenate and sand.

3. Method of claim 2 wherein the sand is of a size between 10 and 14 mesh, both inclusive.

References Cited by the Examiner

UNITED STATES PATENTS

| 2,188,734 | 1/1940 | Carswell | 71—2.3 |
| 2,567,909 | 9/1951 | Linde. | |
| 3,056,723 | 10/1962 | Galloway | 71—2.2 |

FOREIGN PATENTS 589,926   12/1959   Canada.

LEWIS GOTTS, *Primary Examiner.*

M. A. BRINDISI, JULIUS S. LEVITT, *Examiners.*